United States Patent [19]
Chen et al.

[11] Patent Number: 5,671,222
[45] Date of Patent: Sep. 23, 1997

[54] MULTICAST ROUTING IN SELF-ROUTING MULTISTAGE NETWORKS

[75] Inventors: Xiaoqiang Chen, Eatontown; Vijay Pochampalli Kumar, Freehold, both of N.J.

[73] Assignee: Lucent Technologies Inc., Murray Hill, N.J.

[21] Appl. No.: 254,089

[22] Filed: Jun. 6, 1994

[51] Int. Cl.$^6$ .................................................. H04L 12/56
[52] U.S. Cl. ............................................ 370/388; 370/390
[58] Field of Search ........................ 370/60, 60.1, 94.1, 370/94.3, 54, 155, 56, 58.1, 58.2, 58.3, 63, 64, 65, 65.5, 66, 67, 68, 356, 369–375, 380, 382, 384, 385, 387, 388, 389, 390, 392, 397, 399, 408; 340/825.02, 825.03, 825.8

[56] References Cited

U.S. PATENT DOCUMENTS

| | | | |
|---|---|---|---|
| 4,661,947 | 4/1987 | Lea et al. | 370/60 |
| 5,276,425 | 1/1994 | Swanson et al. | 370/60.1 |
| 5,321,813 | 6/1994 | McMillen et al. | 370/94.1 |

OTHER PUBLICATIONS

R. Cusani et al., "A recursive multistage structure for multicast ATM switching," IEEE INFOCOM '91, Apr. 9–11, 1991, pp. 1289–1295. Cited in application; technological background of the invention.

V.P. Kumar et al., "Phoenix: A building block for fault-tolerant broadband packet switches," IEEE GLOBECOM '91, Dec. 1991. Cited in application; technological background of the invention.

E. Balas et al., "Set partitioning: A survey," SIAM Review, vol. 4, Oct. 1976, pp. 710–761. Cited in application; technological background of the invention.

F. Bernabei et al., "On non-blocking properties of parallel delta networks," Proc. IEEE INFOCOM '88, 1988, pp. 326–333. Cited in application; technological background of the invention.

Primary Examiner—Dang Ton

[57] ABSTRACT

An apparatus and method is described for multicasting an inlet data cell, received as part of a multicast request, through a self-routing multistage routing network by decomposing the multicast request into one or more intermediate multicast requests, each intermediate multicast request being a unique subset of the original multicast request which enables a non-blocking, self-routing distribution to a subset of the desired outlets of the original multicast request in one or two passes through the network, and by generating a non-blocking multicast tree based on the intermediate multicast requests and routing the received inlet data cell to the desired outlets. The invention decomposes the original multicast request and generates a non-blocking multicast tree using a cube routing algorithm, a copy routing algorithm, or a combined routing algorithm, which is a combination of the copy and cube routing algorithms.

26 Claims, 11 Drawing Sheets

PARTITION:
{12,14,28,30}
{5,7,21,30}
{4,6}
{19,27}
{25}
{13}
{8}

MULTICAST ROUTING IN SELF-ROUTING MULTISTAGE NETWORKS

TECHNICAL FIELD

This invention relates to a method and apparatus for providing self-routing in multistage networks and, more particularly, for providing multicast routing capabilities in such networks.

BACKGROUND OF THE INVENTION

The goal of Asynchronous Transfer Mode (ATM) is to provide an integrated transport vehicle for a wide range of applications so that improved resource efficiency can be achieved. Many of these applications require multicast (one-to-many) connections in addition to conventional unicast (one-to-one) connections. Therefore, the capability of handling multicast connections is an essential ingredient to any switch architecture design and implementation aimed at ATM networks. Many of the switch architectures found in the prior art employ multistage interconnection networks (MINs), either buffered or not, as a core "routing network" (RN) for the support of unicast connections. To provide the multicast capability, two alternatives are possible. The first approach is to add a "copy network" (CN) at the front of an RN. The function of CN, as its name implies, is to replicate the cell to obtain the number of copies requested by a given multicast connection. Those copies will then be transmitted through the RN to the desired outlets. The design of CN may be quite different from that of RN, and requires extra complex components. This is especially the case when designing a CN which can avoid conflicts inside an RN.

Instead of designing a new CN, the second approach is to exploit the inherent multicast capability of an RN by recycling the cell at the output of an RN to its input to generate extra copies. This approach is termed a "recursive scheme," since it simulates the logical function of a CN by using the RN recursively. This approach is advantageous when a routing network has already been implemented, since it does not require hardware modifications. The simplicity of the network control algorithm for self-routing and hardware implementation makes this scheme attractive. The general scheme is illustrated in FIG. 1 where a self-routing multistage routing network (RN) has expanders and concentrators which enable outlets (O) to be connected to inlets (I) through external links (L). Such a routing network may be based on a Log N-stage banyan network.

While a recursive routing algorithm has been proposed by others (see R. Cusani and F. Sestini, "A recursive multistage structure for multicast ATM switching," *IEEE INFOCOM'91*, Apr. 9–11, 1991, pp. 1289–1295), such recursive routing algorithms have not overcome the problem of blocking in multicast connections.

SUMMARY OF THE INVENTION

The present invention teaches an apparatus and method for multicasting a received inlet data cell, received as part of an original multicast request, through a self-routing multistage switching or routing network RN to desired outlets when most original multicast requests cannot be multicasted through the network in a single pass without causing any undesired outlet to receive the cell. The original multicast request D, defining a set of desired outlets, is decomposed into one or more intermediate multicast requests, each intermediate multicast request being a unique subset of the original multicast request which enables a non-blocking, self-routing distribution to a subset of the desired outlets of the original multicast request in one or two passes through the network. The invention then generates a non-blocking multicast tree based on the intermediate multicast requests and routes the received inlet data cell to the desired outlets.

The invention decomposes the original multicast request and generates a non-blocking multicast tree using a cube routing algorithm, a copy routing algorithm, or a combined routing algorithm, which is a combination of the copy and cube routing algorithms.

The cube routing algorithm decomposes the original multicast request into a plurality of cubes, each cube identifying a set of desired network outlets to which a received data cell can be routed in a single pass through the network; generates a non-blocking multicast tree based on the plurality of cubes; and routes the received inlet data cell to the desired outlets. The cube routing algorithm is recursive. The "distance" between two cubes gives rise to a necessary and sufficient condition required in order to achieve a non-blocking property of the cube routing algorithm.

The copy routing algorithm decomposes the original multicast request by (a) generating $2^{a_i}$ copies of the inlet data cell at contiguous outlets and (b) for each of the copies, addressing a desired outlet of D in either a decreasing or increasing order; and generates a non-blocking multicast tree by repeating steps (a) and (b), for any $a_i \neq 0$, where the multicast request is defined as $|D|=a_{n-1}, a_{n-2} \cdots a_0$.

In the combined routing algorithm, we generate $2^j$ copies of the inlet data cell where $$j = \max\{i, |a_i \neq 0, 0 \leq i \leq n-1\}$$

and then decompose the original multicast request and generate a non-blocking multicast tree using the cube routing algorithm previously described.

The present invention addresses two conflicting requirements: (1) minimization of the number of passes across the network and (2) minimization of the number of internal links (network resources) used.

DETAILED DESCRIPTION

1. Multicast Capability of Banyan Networks

1.1 Multicast routing tag scheme

Figure 2:
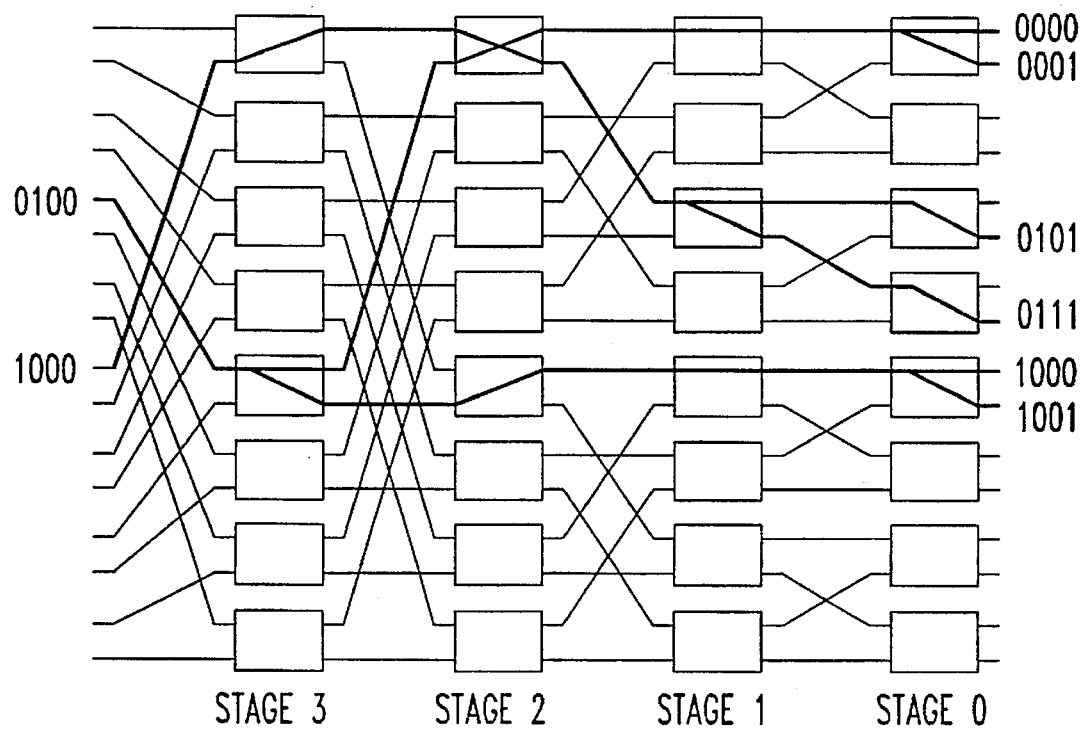
FIG. 2 illustrates a prior art routing network based on a Log N-stage (N=16, 4-stage) banyan network.

With reference to FIG. 2, we, illustratively, consider an $N=2^n$ inlet/outlet banyan network with $n=4$ stages, each stage having N/2 (2×2) switching elements (SEs) such as the PHOENIX switch described by V. P. Kumar et al. in "Phoenix: A building block for fault-tolerant broadband packet switches," *IEEE GLOBECOM'91*, December 1991. A 2×2 SE can be routed to one of the two, or to both, of the SEs to which it connects to support the multicast capability. The uncertainty that each SE has to make a decision with three possibilities is Log 3=1.585, which implies that the minimum multicast routing tag contained in a cell for each SE on the path is 2 bits, making the total bits for n SEs equal to 2n. One scheme to construct a multicast routing tag is to specify the routing tag by $\{R,M\}$, where $R=r_{n-1} \ldots r_1 r_0$ contains the routing information and $M=m_{n-1} \ldots m_1 m_0$ contains the multicast information. To interpret the multicasting tag $\{R,M\}$, an SE at stage i ($0 \leq i \leq n-1$) in the network must examine $r_i$ and $m_i$. (For convenience, the stages are numbered as 0, 1, ..., n-1 from the rightmost to the leftmost.) If $m_i=0$, the normal unicast routing is performed according to the value of $r_i$. If $r_i=0$, then the unicast routing is to the upper output. If $r_i=1$, then the unicast routing is to the lower output. If $m_i=1$, $r_i$ is ignored and the proper upper or lower broadcast is performed depending on the link at which the cell arrived.

In what follows, let $D=d_1,d_2, \ldots, d_k$ be the set of desired outlet addresses of a multicast connection, and |D| be the cardinality of D. We assume that k=|D| has a truncated binomial distribution of order N, i.e., $$p_k = \frac{\binom{N}{k} p^k (1-p)^{N-K}}{1-(1-p)^N}, \quad 1 \leq k \leq N \quad (1)$$

where p is the probability that an outlet belongs to a given multicast connection. In the sequel, we shall use either decimal or binary representation of an outlet or inlet address, depending on the context.

1.2 Multicast capability

Obviously, the multicast routing tag scheme described in the previous section is not capable of performing any arbitrary multicast connection request. Two questions, however, remain to be answered. The first one is how many multicast connections can be routed through the network in a single pass. The second one is concerned with the conditions under which a multicast connection can be routed through the network in a single pass. The answer to the first question is the subject of this section. The answer to the second question is described in the following section.

Since each outlet may be in a given multicast connection or not, thus there are $2^{2^n}$ possible multicast connections. On the other hand, since the network has n stages, and the SE in each stage can be individually set to one of three states, there are $3^n$ different ways to set those SEs. Each distinct setting results in a distinct multicast connection. If we assume a random outlet distribution (i.e., balanced traffic), the probability that a given multicast connection can be realized in a single pass through the network is therefore $$P(n) = \frac{3^n}{2^{2^n}}$$

Figure 3:
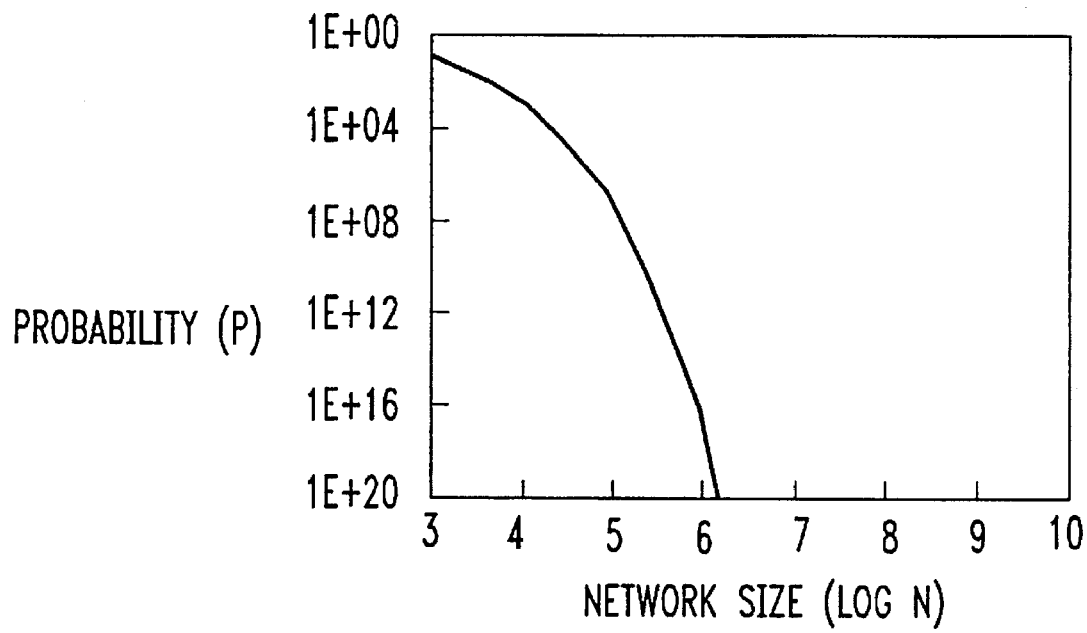
FIG. 3 shows a graph of a single-pass multicast probability (P) of banyan networks.

As shown in FIG. 3, when n=LogN becomes larger, P(n) approaches zero very fast. (Note that, for convenience, in the figures containing graphs, we draw continuous curves rather than a sequence of points.) This clearly demonstrates that the multicast capabilities of this class of networks in a single pass are very limited. This is due to the limited number of states that the network can present. The only way to enhance the network capability is to break this constraint. One alternative is to route the multicast connection in a series of passes across the same network. For example, let the inlet address s=5 and D=2,3,7. It is impossible to route the connection in a single pass. However it could be accomplished by a series of passes. For example, inlet 5 to outlets 2 and 3, and then inlet 5 to outlet 7. This property will be fully exploited in the later sections.

1.3 Passable multicast connections

From the previous discussion, it is evident that the multicast routing tag scheme only allows an inlet to send a cell to a power of two number of outlets. Further, if there are $2^j$ ($0 \leq j \leq n$) outlets for a single-pass multicast, given this scheme for computing and interpreting the tags, there must exist n−j bit positions in which all those outlet addresses agree and consequently there is a fixed set of j bit positions in which any two outlet addresses may disagree. For example, the outlet addresses D=2,3,6 and 7 expressed in binary form D=010,011,110,111 meets this criterion because there are $2^2$ addresses and they differ in two bit positions, the 0th and 2nd. This observation leads to the definition of an important concept: cube.

Definition 1: A cube (implicant in logic minimization terminology) is a set of outlet addresses (integers) which can be reached through the network in a single pass using the routing tag scheme previously described.

From the above discussion, a cube (C) must satisfy the following two conditions:

(a) $|C|=2^j$ ($0 \leq j \leq n$) and (b) (n−j) fixed set of bit positions in which all the elements of C agree.

In order to generate all the possible cubes for a multicast connection, let us refer to cubes which have the cardinality $2^j$ as "j-cubes". Obviously all the elements of D are 0-cubes. While any boolean logic minimization techniques may be employed, the following description utilizes a scheme similar to the Quine-McCluskey method for logical minimization to generate all possible cubes (as described in S. Muroga, Logic *Design and Switching Theory*, John Wiley and Sons, Inc., 1979). In this scheme, all of the pairs of 0-cubes are first combined, if possible, to form 1-cubes. For example, 1001 and 1011 form a 1-cube. In cube notation, this 1-cube can be represented as the replacement of 1001 and 1011 by 10x1, where the x symbolizes a 'don't care' binary position (i.e., it can be 0 or 1). Then these 1-cubes are used to generate all possible 2-cubes. This process continues until all r-cubes are generated for some r ($0 \leq r \leq n$) such that there are no (r+1)-cubes. The entire set of cubes are known as the "complex C" of the set D, while the original outlet addresses (0-cubes) are the "base" of D.

Partition of complex C

Once we have the complex C, our objective is to select the minimal subset of C that constitutes a partition of the base D (0-cubes). A brute-force solution to obtain the minimal partition of D would be to delete cubes one by one from C in all possible ways so that the minimal partition of D can be found among all the partitions. Usually, however, this approach is excessively time-consuming because D may contain as many as $2^{n-1}$ cubes.

It can be easily shown that this problem is closely related to the well-known Set-Partitioning Problem (SPP), being essentially an SPP with equal cost constraint. (See the article written by E. Balas and M. Paberg, "Set partitioning: A survey," *SIAM Review*, Vol. 4, October 1976, pp. 710–761.) When the number of cubes is too large, derivation of a minimal partition is impossible to obtain in polynomial time since this is known to belong to the class of NP-complete problems.

To solve the above problem, we developed a "greedy" method which attempts the largest possible cubes in descending order of their size. The procedure to implement this method is illustrated in Procedure 1 where the input C is sorted in size.

```
Procedure 1: Greedy partitioning algorithm
Input: C = { C₁,C₂,...,Cᵣ }, |Cᵢ|≥|Cᵢ₊₁|,D
Output: P = { P₁,P₂,...,Pₘ }
begin
    P = C₁
    K = |C₁|
    for (i = 2,3,...,r)do
        if (K = |D|)then exit
        else
            if (Cᵢ ∩ P = 0)then
                P = P ∪ Cᵢ
                K = K + |Cᵢ|
            endif
        endif
    endfor
end
```

Figure 4:
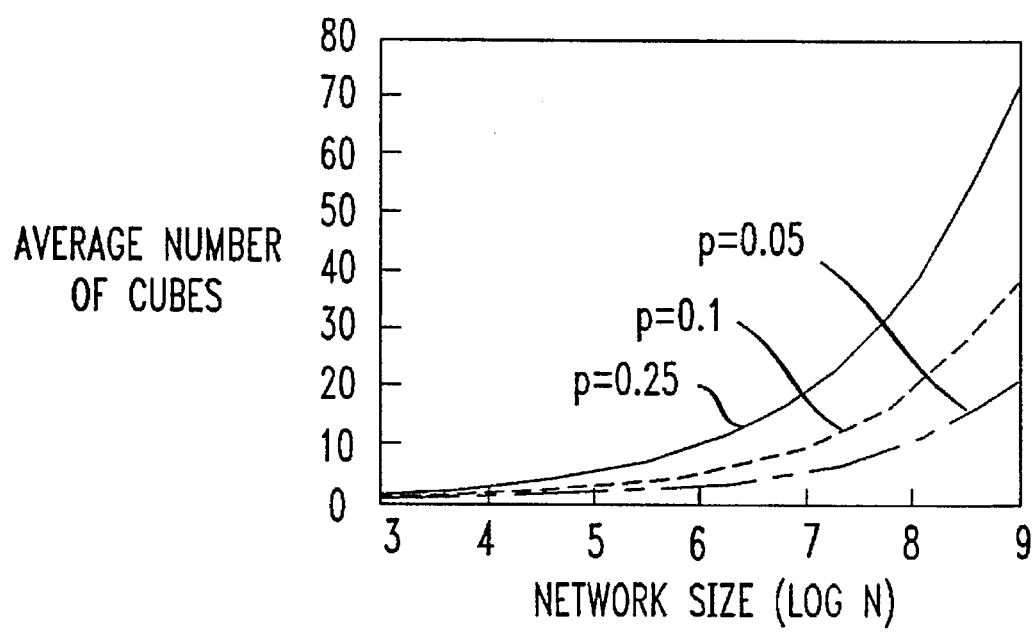
FIG. 4 shows a graph of how the average number of cubes vary with the probability parameter (p) and network size (stages)

Shown in FIG. 4 is the average number of cubes for a given network size (Log N) and probability p (from Equation 1). To capture the average performance requires the generation of a large number of multicast instances and then by using Procedure 1, we obtain the average performances by averaging over a set of randomly generated multicast connections. The statistics shown in FIG. 4 are based on the distribution of the multicast connection size given by Equation 1 for the probability values of p=0.05, 0.10, 0.25. For example, when the network size n is 9 and p is 0.25, the average number of cubes generated by Procedure 1 is roughly 72.

It is worth pointing out that for a given cube it is straightforward to compute its multicast routing tag. For illustration, if C=1xx0, the corresponding routing tag M is 0110, and R can be any one of the outlet addresses belonging to the cube C. For the above example, R could be 1000, 1010,1100, or 1110.

2. Routing Algorithms

The sequence of passes through the network required to route a multicast connection can be modeled as a "multicast tree". A routing algorithm generates a multicast tree by properly choosing the outlets to be reached at each pass. The choice of the multicast tree is strongly dependent upon the multicast capability constraints imposed by banyan networks and by the traffic pattern present at the connection set-up time. The major objective is to design a routing algorithm which minimizes the number of network passes through the network to minimize the total number of cells circulating in the network while employing the minimal amount of network resources. Two performance measures, the average number of passes through the network and the average number of internal links used per outlet, are used to compare the proposed routing algorithms. The former serves as an indication of average delay each cell experiences through the network. The latter is a measure of the amount of network resources that an algorithm utilizes. The present invention describes three routing schemes: I, II and III. Except for the routing scheme III, we assume that any outlet receiving a cell must be either a desired outlet or a branching node which will recycle the received cell, or both. 2.1 Cube routing algorithm—routing scheme I This method accomplishes an arbitrary multicast connection by decomposing the original multicast connection into one or more intermediate multicast connections (cubes), each of which can be routed in one pass. In the previous section, we have already given the procedure to generate the partition P of D. Once this is determined, our next task is to build a multicast tree based on the cubes belonging to P. Before giving an algorithm for this purpose, we first introduce the "distance" concept and a method which maintains non-blocking property of a multicast tree.

It is known that there exists a necessary and sufficient condition for any two unicast connections to be routed through the baseline network without conflicts. (See, for example, the article by F. Bernabei et al., "On non-blocking properties of parallel delta networks," *Proc. IEEE INFOCOM'88*, 1988, pp. 326–333.) As will be described below, the results can be extended to banyan networks and in particular to the case of multicast connections.

Definition 2: The distance between two inlets $s_1,s_2$ at the input of a banyan network is defined as $$d_{in}(s_1,s_2) = \min z \lfloor s_1/2^z \rfloor \bmod 2 \neq \lfloor s_2/2^z \rfloor \bmod 2, \; z=0,1,\ldots,n-1 \quad (2)$$

In binary representations of inlets, the distance defined above is equal to the least significant bit position in which the two inlets differ. For example, assume that $s_1$=1010 and $s_2$=1100, and we have $d_{in}$=1 since bit position 1 (the second far-right bit position) is the least significant bit position in which $s_1$ and $s_2$ disagree. Note that $d_{in}$ is an integer in the range of [0, n−1].

Definition 3: The distance between two cubes $C,C_2$ at the output of a banyan network is defined as $$d_{out}(C_1,C_2) = \min \{\max_{u \in C_1, v \in C_2} z \lfloor u/2^z \rfloor \bmod 2 \neq \lfloor v/2^z \rfloor \bmod 2, z=0,1,\ldots,n-1\}. \quad (3)$$

In binary representations of cube, the distance defined above is equal to the most significant bit position in which the two cubes differ. Given $C_1$=xx01 and $C_2$=x110, for example, we have $d_{out}$=1 since the most significant bit position where the two cubes differ is the first bit position.

Note that the two cubes do not differ in the second bit position and that we need only to look at those positions where there is no x. The binary representation eases the computing of the distance $d_{out}$ or $d_{in}$.

The following equation establishes the necessary and sufficient condition that two inlets are routed to two cubes through a banyan network without blocking.

Let two selected inlets of a banyan network be at distance $d_{in}$ and connected to two disjoint cubes at distance $d_{out}$. The two multicast connections can be routed without conflict if and only if $$d_{out} - d_{in} > 0 \qquad (4)$$

An example is illustrated in FIG. 2 where for $s_1=4$, $D_1=0$, 1, 8 and 9 and $s_2=8$ and $D_2=5$ and 7, we get $s_1=0100$, $s_2=1000$, $C_1=x00x$, $C_2=01x1$, and we obtain $d_{in}=2$ and $d_{out}=2$. Since Equation 4 is satisfied, the two multicasts can be routed through the network without internal blocking.

It is evident from Equation 4 that any pair of inlets at distance of 0 can route any two disjoint cubes respectively without causing conflicts in the banyan network. It also holds that any two disjoint cubes at distance of (n−1) can be addressed by any two inlets without conflicts.

Procedure 2 gives an iterative algorithm which generates the multicast tree.

---

Procedure 2: Cube routing algorithm
Input: $P = \{ P_1, P_2, \ldots, P_m \}, |P_i| \geq |P_{i+1}|$
Output: a multicast tree, each node corresponding to a cube in P
Define: L as the number of passes through the network
begin
    INPUT = $P_1$
    $P = P - P_1, L = 1$
    while (P ≠ 0)do
        OUTPUT = 0
        for (each inlet in INPUT) do
            scan P until a largest cube $P_i$
            has been found which has no conflicts
            with other selected inlet cube combinations
            $P = P - P_i$
            OUTPUT = OUTPUT $\cup$ $P_i$
        endfor
        INPUT = OUTPUT
        L = L + 1
    endwhile
end

---

For each inlet in INPUT, this algorithm scans P for a largest cube which has no conflicts with other already selected cubes in OUTPUT. When one is found, the corresponding cube is removed from P and put into OUTPUT. When all the inlets in INPUT have been selected, the next iteration is performed by using OUTPUT as INPUT according to the recycling mechanism. This iterative process continues until all the cubes in P have been removed. Our results have indicated that performance is insensitive to the way that each inlet in INPUT is selected.

Figure 5:
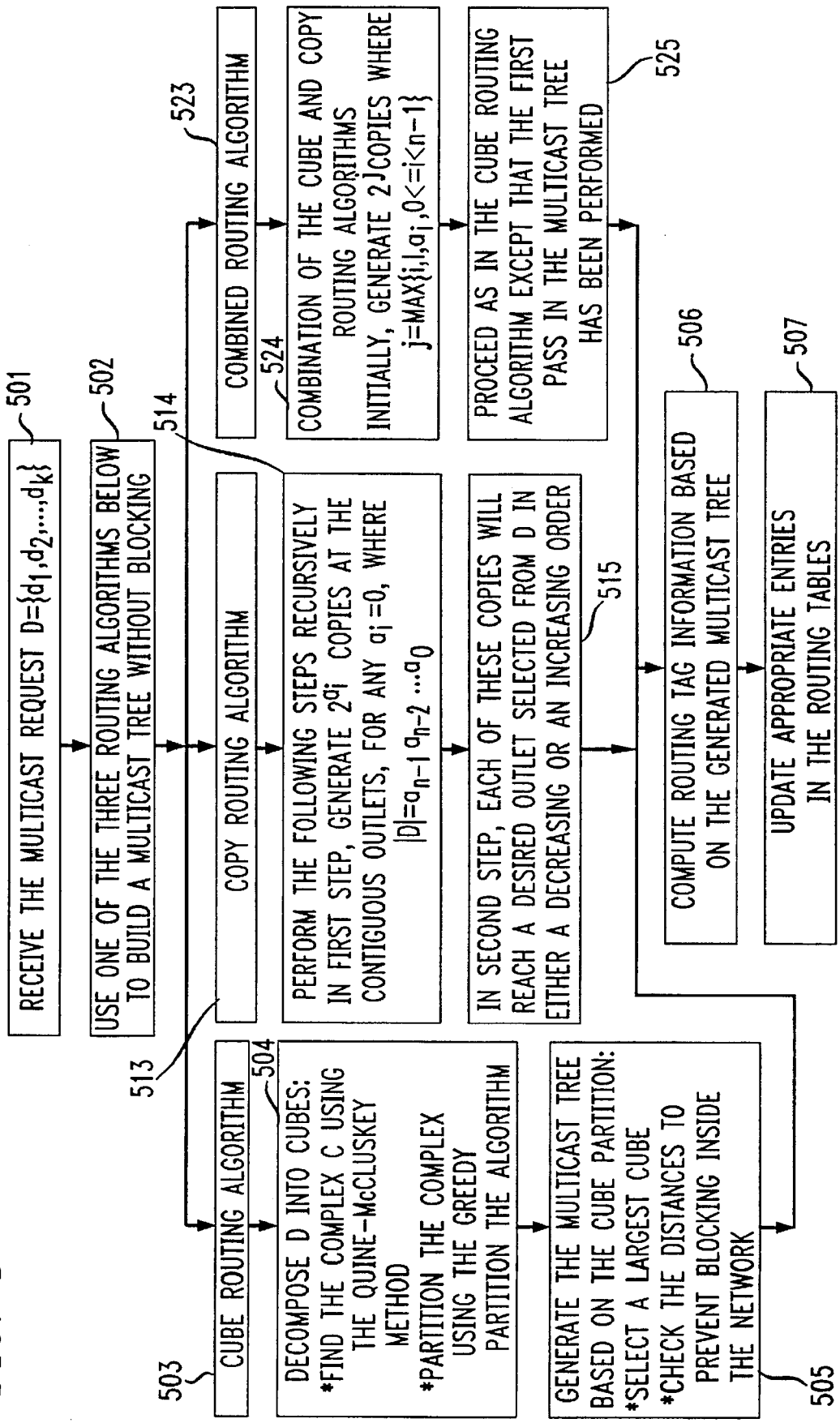
FIG. 5 shows a flow chart of the cube, copy and combined routing algorithms used by the present invention.

Shown in FIG. 5 is an illustrative flow chart describing the processing of a received multicast request which defines the multicast outlets $D=d_1, d_2, \ldots, d_k$. Note, the multicast request can be derived from signaling messages received at a source inlet port or directly received by the controller. In step 501, the multicast request is received by the controller of the self-routing multistage network (e.g., a banyan network). In steps 502 and 503, the controller selects the cube routing algorithm. In step 504, the controller finds the complex $C=\{C_1, C_2, \ldots, C_r\}$ using the Quine-McCluskey method and then partitions the complex C using the greedy partitioning algorithm—Procedure 1. In step 505, the controller generates the multicast tree using the cube routing algorithm of Procedure 2 and checks the distances between cubes to prevent blocking inside the network. In step 506, the controller computes the routing tag {R,M} information to implement the multicast tree. In step 507, the controller sends the routing tag information to routing tables for each concentrator and expander (I/O controllers) identified in the multicast tree.

Figure 1:
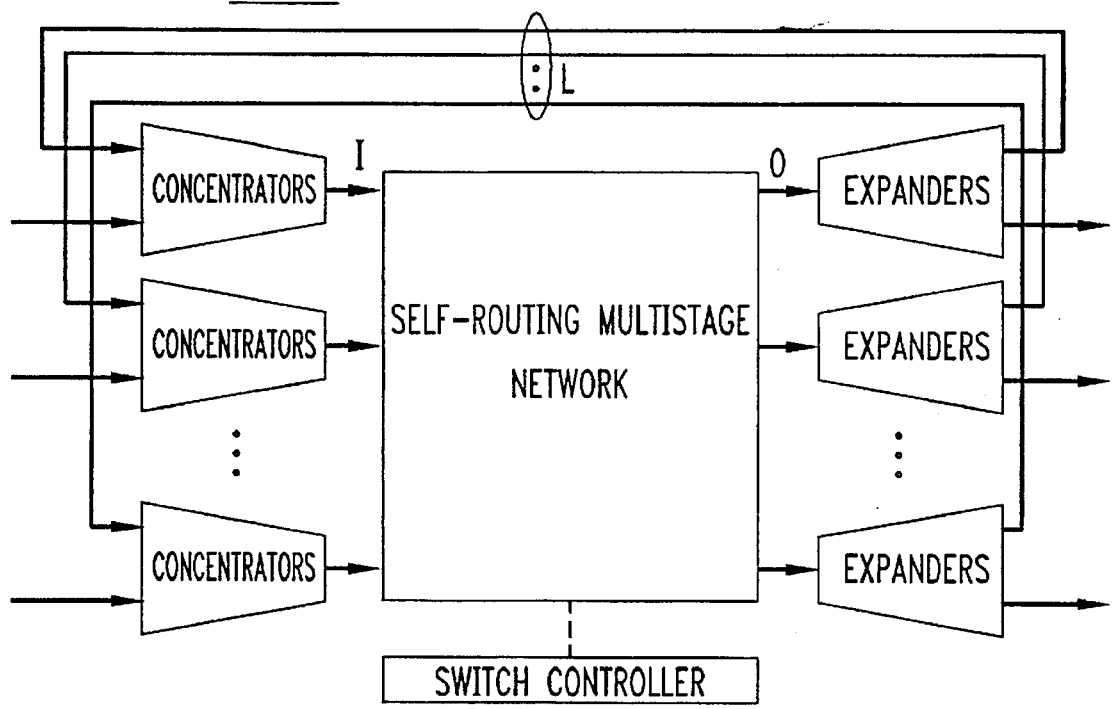
FIG. 1 illustrates a prior art self-routing multistage network (RN) in which the present invention may be implemented.
Figure 6:
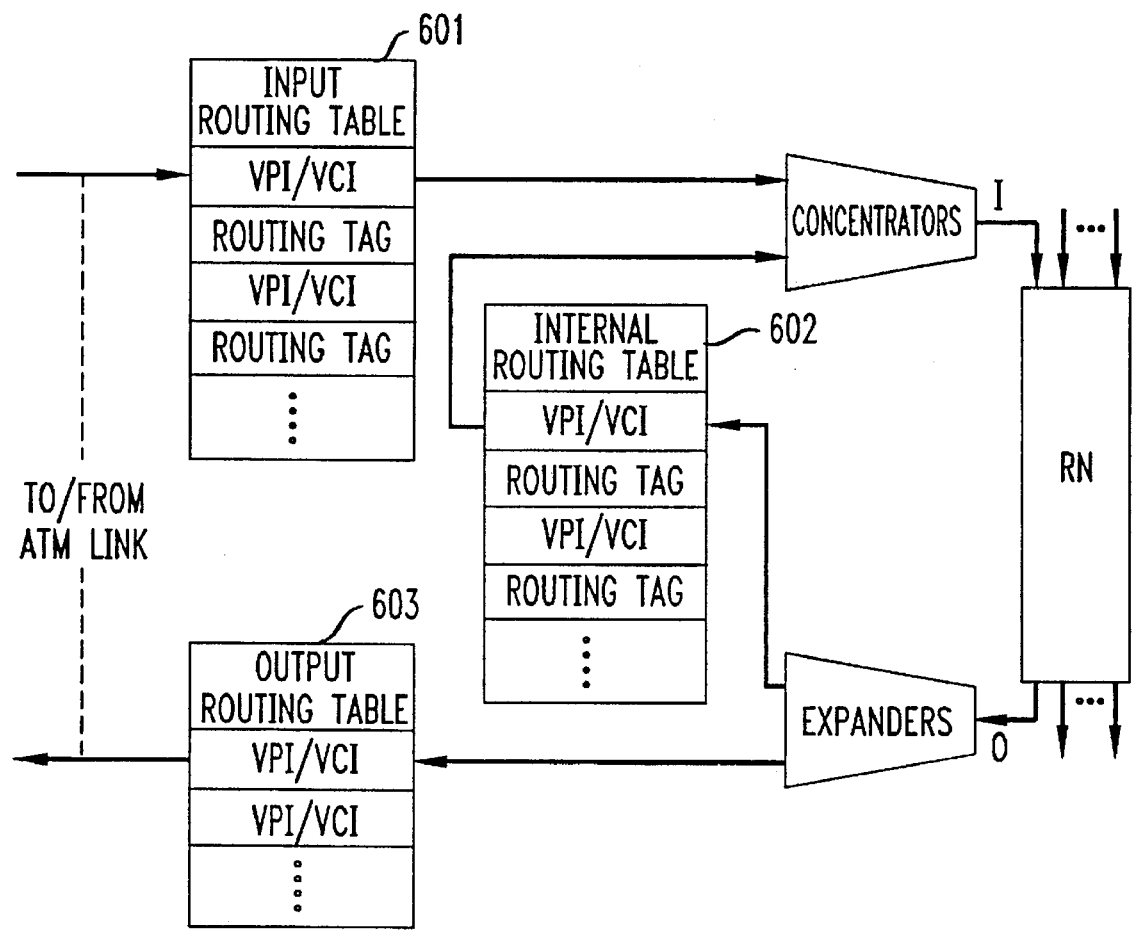
FIG. 6 shows the input, output and internal routing tables associated with each inlet (I)/outlet (O) pair of the routing network RN.

FIG. 6 illustrates a particular implementation of a self-routing multistage network which includes the input, internal and output routing tables (601–603) used in the concentrator and expander units. The input and internal routing tables 601 and 602 can be part of the concentrator unit of FIG. 1 while the output routing table 603 can be part of the expander unit of FIG. 1. Of course, it should be understood that the three routing tables 601–603 can be implemented using one physical table means. These routing tables 601–603 can be pan of a memory unit of the controller of FIG. 1.

Separate input, internal and output routing tables are required when it is desired to have the incoming VPI/VCI, internal VPI/VCI, and outgoing VPI/VCI information be selected independently of each other. The well-known VPI/VCI information is the call path and call cell identification in the cell header which is translated at each switch (self-routing multistage network RN) along the call path.

If internal VPI/VCI information in the routing network RN can be selected to be different from the input VPI/VCI information to the routing network RN, then the internal routing table can be eliminated and only input and output routing tables (601 and 603) are needed. Similarly, if the output VPI/VCI information for the multicast connection is the same, then the output routing table can be eliminated and hence only the input routing table 601 is needed (e.g., a unicast connection).

Figure 7:
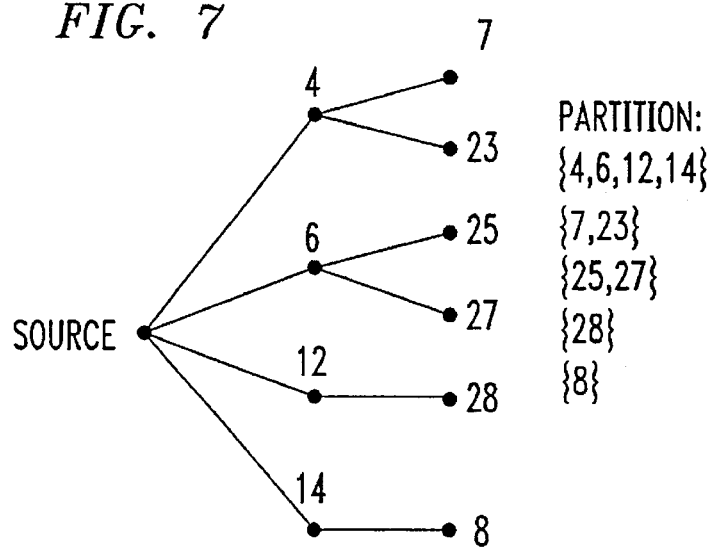
FIG. 7 shows a first example of a multicast tree generated for a particular multicast request using the cube routing algorithm.
Figure 8:
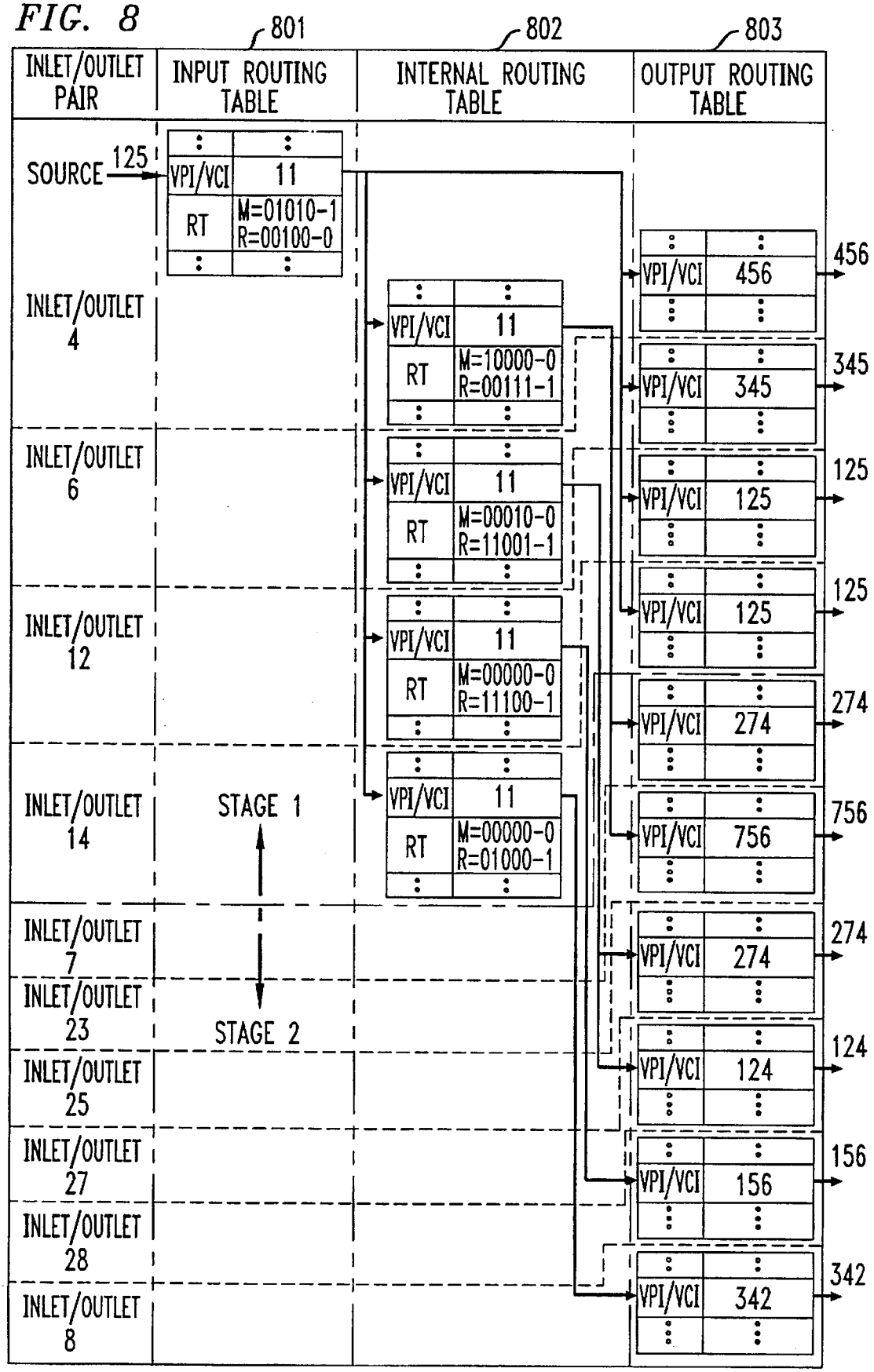
FIG. 8 shows illustrative routing table entries for the multicast tree generated in FIG. 7.

With joint reference to FIGS. 7 and 8, we illustrate the routing information which is sent to the routing tables to process the multicast request D={4,6,7,8,12,14,23,25,27, 28}. This information includes the VPI/VCI information as well as the routing tag bits M and R.

Note that in the multicast tree of FIG. 7 the multicast outlets of the first stage are selected as inlets for the second stage (i.e., network outlets 4, 6, 12 and 14 from the first pass through the network become inlets for the second pass through the network). Note also that the internal VPI/VCI number 11 is the unique multicast connection identifier from the routing network (RN).

The input routing table 801 shows M=01010–1 and R=00100–0 producing the cube 0x1x0 which in binary notation identifies the inlet/outlets 4, 6, 12 and 14. Since the M value is followed by a "−1", it indicates that the inlet/outlets 4, 6, 12 and 14 are both outlets and serve as inlets (or recycle inlets) for the second stage of the tree (second pass through the routing network RN). When the M value is followed by "−1", we ignore the "−0" bit in the R value.

The internal routing tables 802 select outlets 7 and 23 for the second stage inlet 4; select outlets 25 and 27 for the second stage inlet 6; select outlet 28 for second stage inlet 12; and select outlet 8 for second stage inlet 14. Note, the "−0" value following the M values indicates that these are only outlets, i.e., there is no recycling back to an inlet. The "−1" value following the R value also indicates an output-only function to the identified outlets.

The output routing tables 803 convert the internal VPI/VCI number 11 to the VPI/VCI number identified by the destination routing network RN (or switch) to which the outlet is connected.

Figure 9:
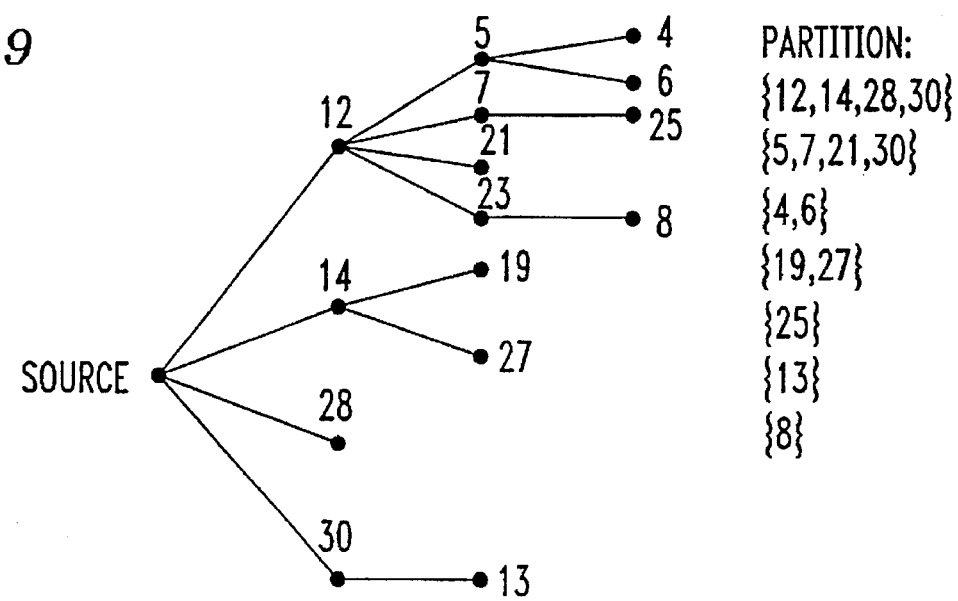
FIG. 9 shows a second example of a three-stage multicast tree generated by the cube routing algorithm for a different multicast request.

FIG. 9 shows a three-stage multicast tree generated by the cube routing algorithm for the multicast request D={4,5,6, 7,8,12,13,14,19,21,23,25,27,28,30} and the cube partitions for each. Note that the cube partition for FIG. 7 utilizes only two stages (or passes through the network) while that of FIG. 8 utilizes three stages. The more stages required, the longer the delay time required to pass a data cell through the routing network.

Figure 10:
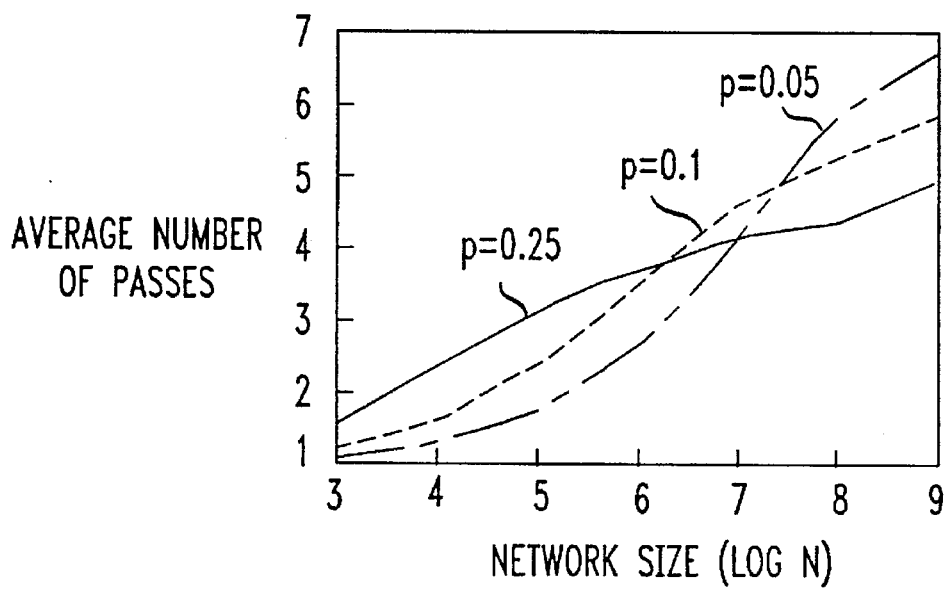
FIG. 10 is a graph showing how the average number of passes varies with parameter p and network size for the cube routing algorithm.

FIG. 10 plots the average number of passes obtained for different values of probability parameter p=0.05, 0.1, 0.25 against the network size. The effectiveness of this routing scheme becomes clear when we compare the results of FIG. 4 and FIG. 10. In FIG. 4, we have seen that when the network size is LogN=9 and p=0.25, the average number of cubes is roughly 72. In contrast, it can be found from FIG. 10 that the average number of passes required to transmit 72 cubes is only about 5. This exponential nature of deduction in the number of required passes results from the recycling scheme. For small network size, the average number of passes is proportional to p. However, as the network size grows larger, the reverse takes place. This suggests that this scheme is more effective when the product of the parameter p and the network size n (LogN) is sufficiently large.

Figure 11:
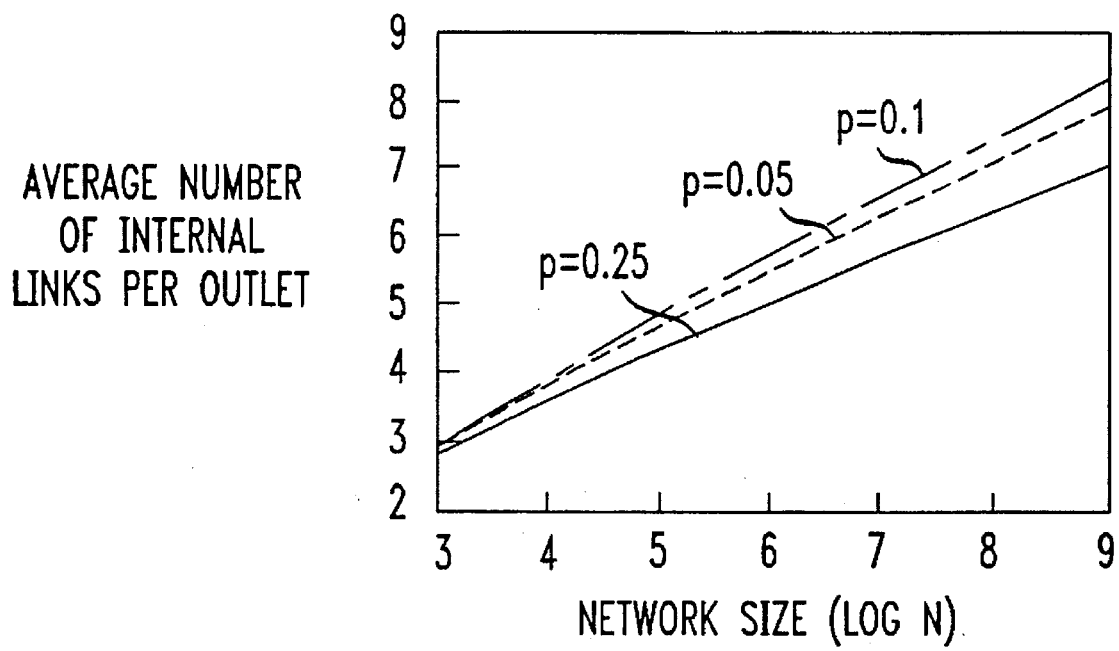
FIG. 11 is a graph showing how the number of internal links per outlet varies with parameter p and network size for the cube routing algorithm.

FIG. 11 examines the average number of internal links per outlet for the settings used in FIG. 10, where in general the usage of internal links steadily increases with the size of the network. In contradiction to intuition, the larger p (i.e., the size of a multicast connection) is, the fewer internal links a multicast connection will use. This once again demonstrates that this scheme is cost-effective for the dense multicast connections in terms of the size of |D|. Comparing p=0.05 and p=0.25 when n=9, the savings on the internal links are roughly 15% for p=0.25. The effectiveness becomes more evident as the network size grows.

Figure 12:
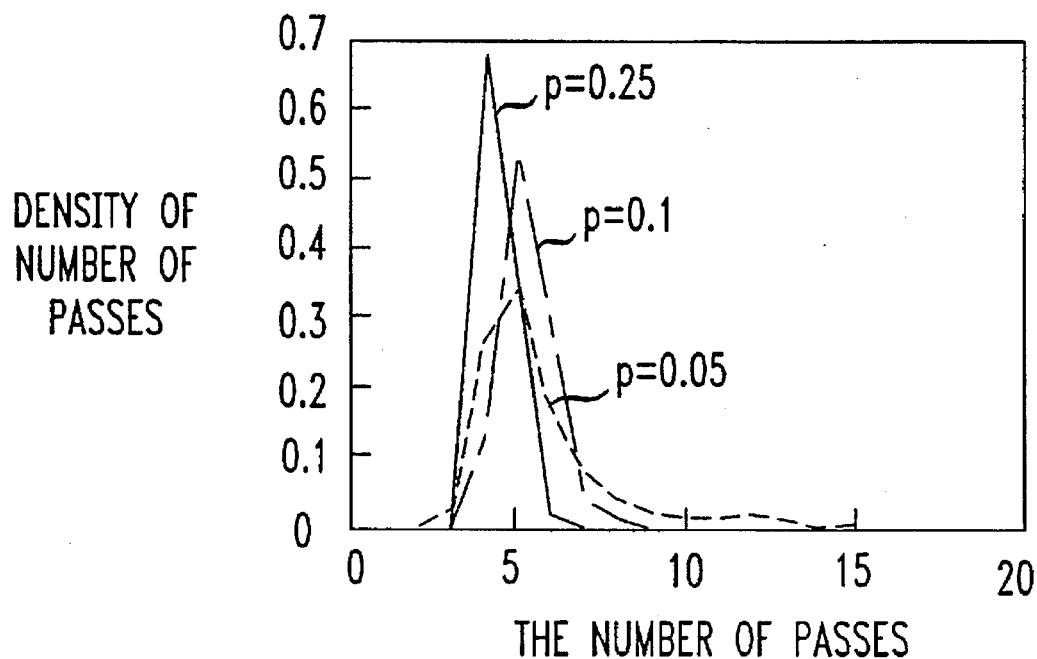
FIG. 12 is a graph showing the density of the number of passes for the cube routing algorithm.

Since the results shown above are concerned with the average performance, it is interesting to know how the performance measures are distributed around the average. FIG. 12 gives a set of curves about the distributions of the number of passes for the network size n=8 and p=0.05,0.1, 0.25, respectively. We observe that the densities are evenly distributed around their averages. For instance, the probability that the number of passes is larger than 7 when p=0.25 is as low as 1%.

2.2 Copy routing algorithm—routing scheme II

For a given multicast connection D, the binary presentation of integer |D|=k can be written as $$k = \sum_{i=0}^{n-1} a_i 2^i$$

where the corresponding $a_i$'s ($0 \leq i \leq n-1$) can be evaluated recursively by using the equation $$a_i = \frac{k - a_0 - a_1 2 - \ldots - a_{i-1} 2^{i-1}}{2^i} \mod 2$$

With reference to FIG. 5, in this scheme, routing is performed in steps 513–515. In the first step, 513, the copy routing algorithm is selected. Steps 514 and 515 are performed recursively. In step 514, the copy process takes place. In particular, for any $a_i \neq 0$, this process generates $2^{a_i}$ copies ($a_i$-cube) which appear contiguously at the output of the banyan network. This is to simulate the function of a copy network. In step 515, those $2^{a_i}$ copies are recycled back to the network input and each copy is addressed, as a unicast connection, to an outlet of D in either a decreasing or an increasing order so that all these copies will not cause conflicts within the banyan network. These steps are accomplished by the same banyan network, achieving a full pipelining of information flow. Thereafter, steps 506 and 507 are performed to compute and distribute routing tag information as previously described.

Given p and n, the average number of passes, m, can be evaluated as $$m = \sum_{k=2}^{2^n-1} \left\{ a_0 + 2 \sum_{i=1}^{n-1} a_i \right\} p_k + p_1 + p_{2^n} \qquad (5)$$

Figure 13:
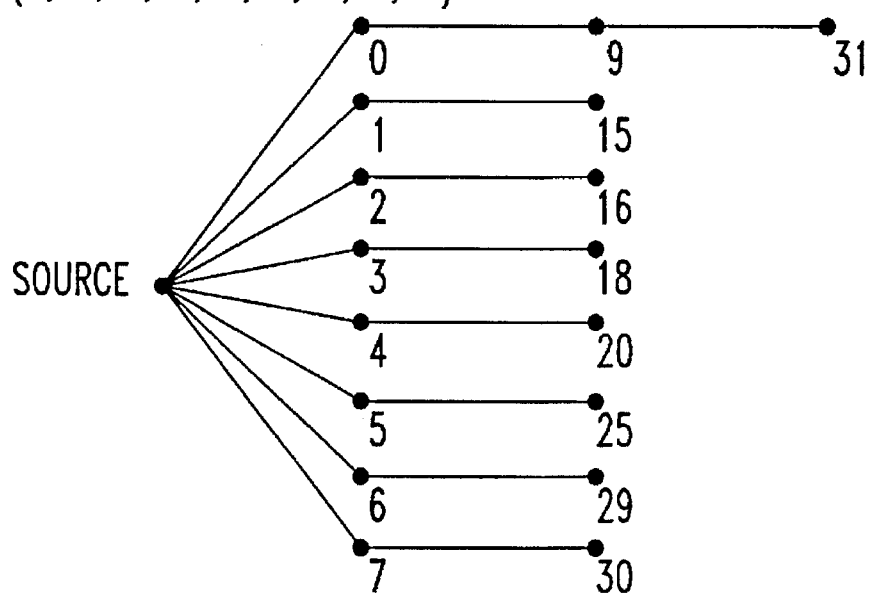
FIG. 13 shows an example of a multicast tree generated for a multicast request using the copy routing algorithm.

Shown in FIG. 13 is an illustrative multicast tree generated by the copy routing algorithm for the outlets D={9,15, 16,18,20,25,29,30,31 }.

The corresponding average number of internal links per outlet is given by $$l = \sum_{k=2}^{2^n-1} \frac{1}{k} \left\{ a_0 n + \sum_{i=1}^{n-1} a_i [(n-1-i) + 2^{i+1} + n 2^i] p_k \right\} + \qquad (6)$$

$$np_1 + \frac{2(2^n-1)}{2^n} p_{2^n}$$

Figure 14:
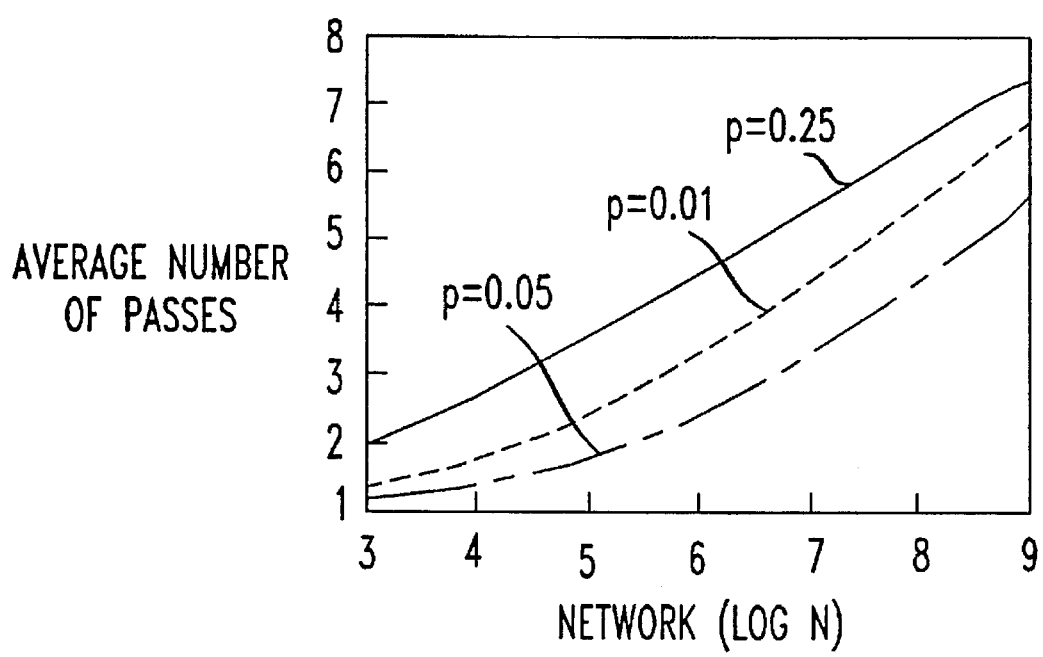
FIG. 14 is a graph showing the average number of passes for the copy routing algorithm.
Figure 15:
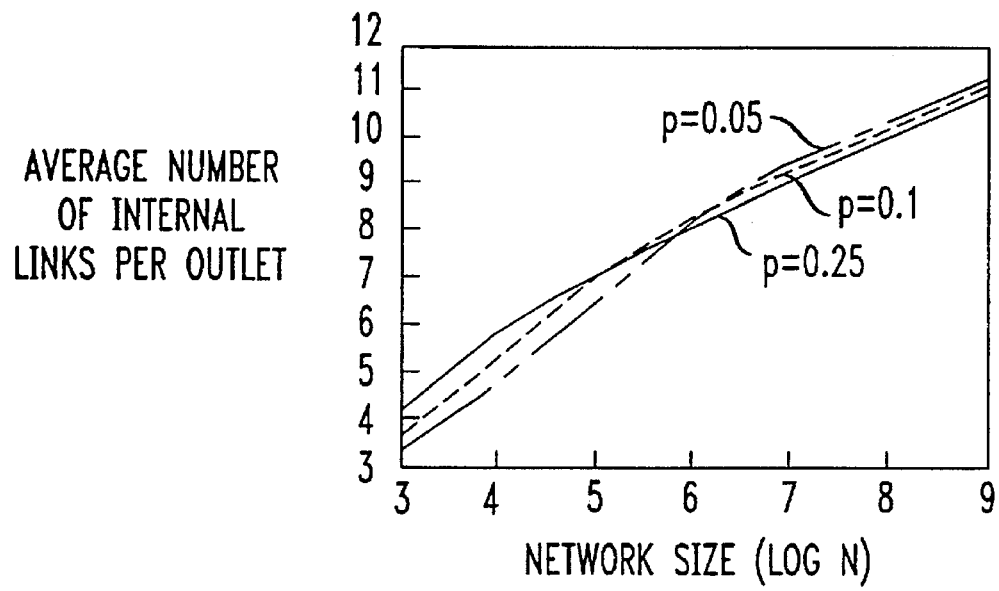
FIG. 15 is a graph showing the average number of internal links per outlet for the copy routing algorithm.

The numerical results computed from Equation 5 and Equation 6 above are illustrated in FIG. 14 and FIG. 15, respectively. FIG. 14 shows steady performance of this scheme for various values of p compared with FIG. 10. This is due to the fact that this scheme does not take advantage of cube property since it merely makes copies in the first step and sequentially transmits those copies in a unicast fashion during the second step. As illustrated in FIG. 15, the differences between average number of internal links per outlet for various p are marginal. It is also noticed that for the large product of p and n the performance is slightly improved.

The major advantage of this scheme is that it avoids the computation of the complex C and the partition of P.

2.3 Combined routing algorithm—routing scheme III

Figure 16:
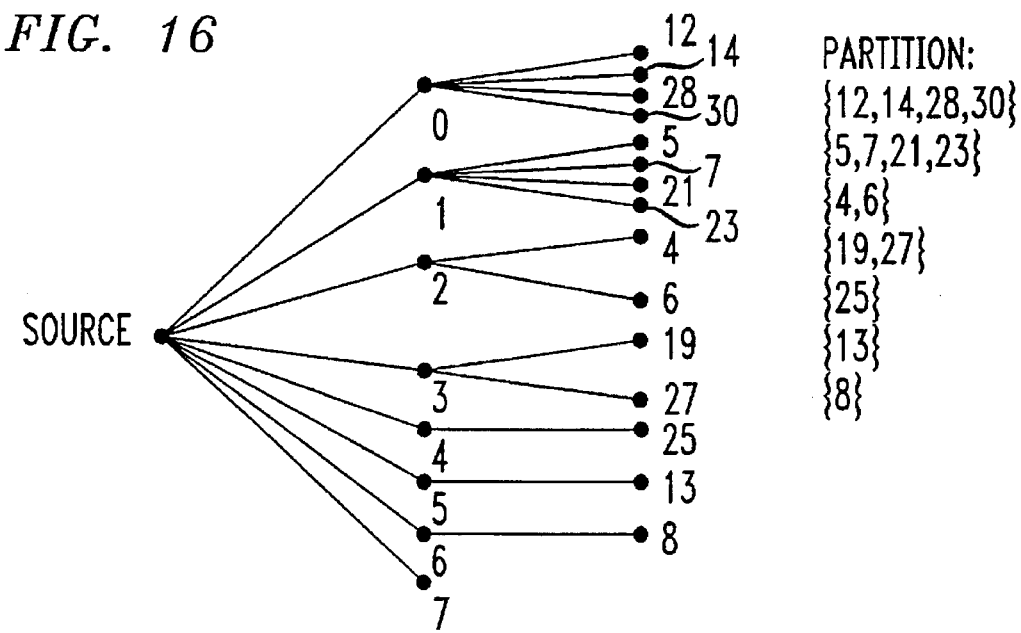
FIG. 16 is an example of a multicast tree generated for a multicast request using the combined routing algorithm.

Shown in FIG. 16 is a multicast tree generated by the combined routing algorithm (i.e., the copy routing algorithm for stage 1 and the cube routing algorithm for other stages). This algorithm is the combination of the previous two schemes in an attempt to keep the balance between the number of passes and the number of internal links per outlet. This scheme is motivated by the observation from FIG. 10 that when the network size is large, the average number of passes is in inverse proportion to the value of p. This attributes to the exponential nature of multicast tree. To further enhance the performance for small p, it seems necessary to generate more copies at the initial stage of building up the multicast tree. On the other hand, the routing scheme II produces a rather different performance where the average number of passes is in direct proportion to the value of p.

The combined routing scheme is basically the same as the scheme I, except the first pass is generated according to j cube where $$j = \max\{i, |a_i \neq 0, 0 \leq i \leq n-1\}.$$

Figure 17:
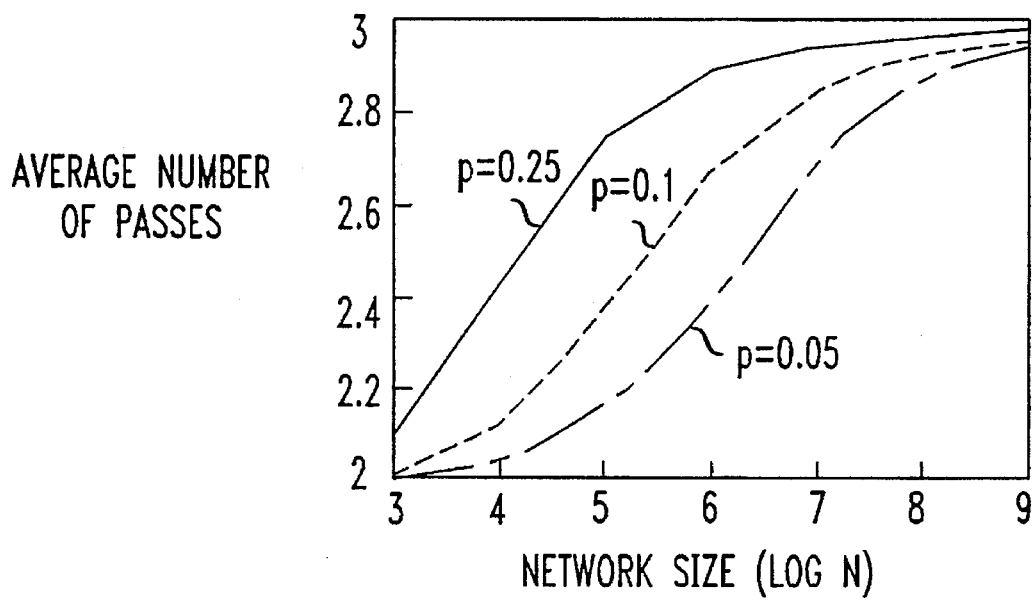
FIG. 17 is a graph showing the average number of passes for the combined routing algorithm.
Figure 19:
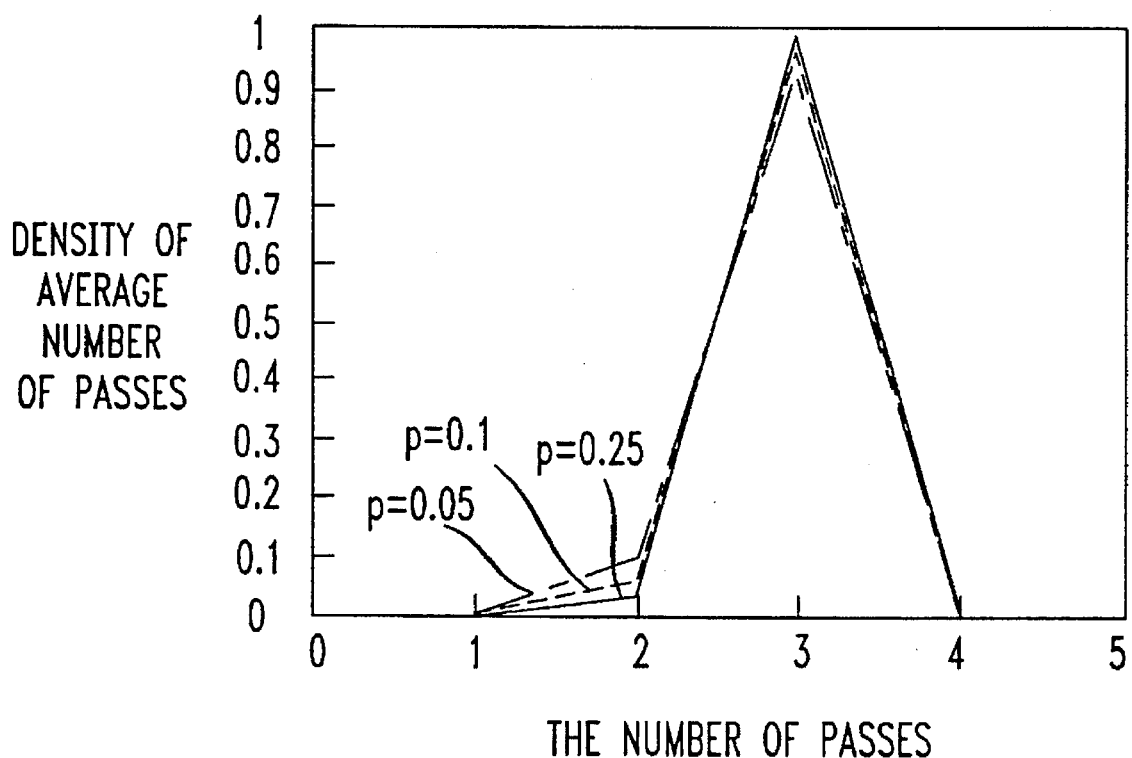
FIG. 19 is a graph showing the density of the number of passes for the combined routing algorithm.

The idea is to generate as many copies as necessary at the initial stage in the build-up process of multicast tree. This in turn will benefit from the exponential property of the tree generated on the basis of cubes. In the subsequent stages, the scheme proceeds exactly as the scheme I. As a result of generating the large number of copies in the first stage, the average number of passes has been significantly reduced as shown in FIG. 17. As expected, the performance lies in somewhere between the scheme I and scheme II. In fact, it is shown that the average number of passes appears to be bounded by the value of 3 regardless of the choice of p. This indicates the robust nature of this algorithm in the sense that it performs equally well for various p provided that the network size is sufficiently large. Once again, FIG. 19 looks at the distribution of number of passes for the case of n=8, where the robustness of this scheme is demonstrated since the performances are comparable for different values of p.

Figure 18:
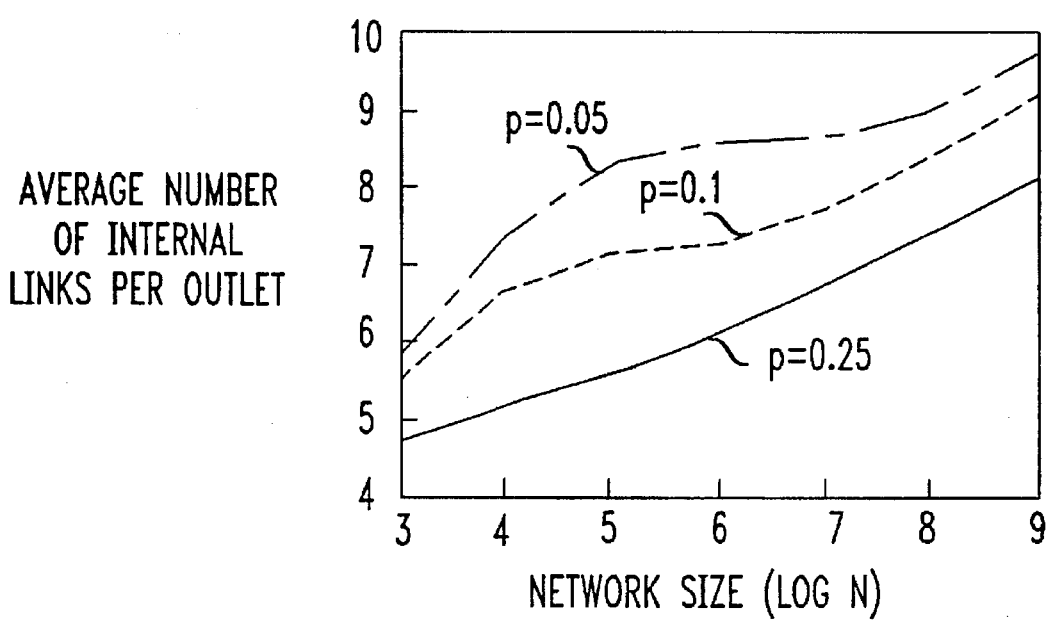
FIG. 18 is a graph showing the average number of internal links per outlet for the combined routing algorithm.

FIG. 18 plots the average number of internal links per outlet for different values of p. The comparison between FIG. 11 and FIG. 18 reveals that the reduction in terms of the average number of passes for the combined routing scheme is achieved at the cost of slight increase of average number of internal links. Like the scheme I, the performance shown in FIG. 18 strongly favors the choice of large p. This shows that using this scheme the better utilization of network resources (internal links) will be achieved for large size of multicast connections (large p).

Conclusions

The concept of cube (implicant), utilized previously for logic minimization, has been shown to be useful to the problem of multicast routing for general multistage networks. The demonstrated advantages of decomposing a multicast connection into associated cubes are significant. The distance between cubes has enabled the constructing of multicast tree without internal blocking.

The cube routing algorithm has significantly reduced the average number of passes required to accomplish a multicast connection. The potential multicast capability of multistage networks is greatly enhanced through the construction of multicast tree on the basis of cubes, often in the order of exponential increase.

The copy routing algorithm is simple and easy to implement, but does not provide the desired performance. The provision of the initial copies as opposed to the cube routing algorithm has provided the steady performance for the average number of passes, as demonstrated by the combined routing scheme. This performance improvement is however achieved at the expense of slightly increasing the average number of internal links used. The optimal utilization of internal links can be achieved if the average size of multicast connection (the product of p and n) is sufficiently large. This may in turn indicate that the presence of multicast connection for multistage networks will generally improve the throughput of network rather than degrade its performance as we may have first thought. Finally, there are several contributing factors that influence a practical choice of preferable routing algorithms for particular applications. These include network size, the multicast distribution, and performance requirements.

While the foregoing has been described with reference to banyan networks designed as ATM switches, it can more generally be applied to other self-routing multistage networks where they may be used as the interconnection network for multiprocessor or distributed systems.

The present invention can be used in all self-routing multistage switching networks including those that use electronic, optical, or combination type switches. Moreover, while the present invention has been described for switches that use switching elements of degree 2 (e.g., the banyan network of FIG. 2), it can more generally be used with switching elements of degree larger than 2. When a network with switching elements of degree larger than 2 is utilized, the decomposing step would use a multi-value logic minimization procedure to identify cubes. Furthermore, the distance and non-blocking procedure previously described can be generalized in a straightforward manner to such a network. Additionally, the switching element can be unbuffered or buffered and, if buffered, the memory can be dedicated to each input/output or shared among all of the inputs and outputs.

Furthermore, while the present invention has been described as using several passes through the same physical network, it could also utilize more than one physical network for implementing the multicast tree. For example, when using a combined routing algorithm, a first separate physical network could be used to generate the copies while a second physical network, connected in series with the first network, may be used for the cube routing algorithm.

What has been described is merely illustrative of the application of the principles of the present invention. Other arrangements and methods can be implemented by those skilled in the art without departing from the spirit and scope of the present invention.

We claim:

1. A method for multicasting an inlet data cell, received as part of an original multicast request D, through a self-routing multistage network apparatus, having n=log N stages, where N is the number of inlets/outlets of the network to a plurality of desired outlets, the method comprising the steps of decomposing the original multicast request D, defining a set of desired outlets, received by a single self-routing multistage network into a plurality of intermediate multicast requests, each intermediate multicast request being a unique subset of the original multicast request and including a 2n routing tag which enables a non-blocking, self-routing distribution to a subset of the desired outlets of the original multicast request in one or two passes through the network, and generating a non-blocking multicast tree based on the intermediate multicast requests and routing the received inlet data cell to the desired outlets by recirculation of at least one intermediate multicast request through the network.

2. The method of claim 1 wherein the decomposing step and generating step use a Cube routing algorithm to decompose the original multicast request into a plurality of cubes, each cube being an intermediate multicast request identifying a subset of the desired outlets to which an inlet data cell can be routed in a single pass through the network.

3. The method of claim 2 wherein the decomposing step includes the step of decomposing the original multicast request received by the network into a plurality of cubes, each cube being an intermediate multicast request identifying a subset of the desired outlets to which the inlet data cell is routed in a single pass through the network.

4. The method of claim 1 wherein the decomposing step uses a Boolean logic minimization procedure to decompose the original multicast request D, defining a set of desired outlets, received by the network into a plurality of intermediate multicast requests, each intermediate multicast request being a unique subset of the original multicast request and including a routing tag which enables a non-blocking, self-routing distribution to a subset of the desired outlets of the original multicast request in one or two passes through the network.

5. The method of claim 1 wherein the network includes switching elements of degree larger than 2 and wherein the decomposing step uses a multi-value logic minimization procedure to identify cubes of the original multicast request D, each cube defining an intermediate multicast requests, each intermediate multicast request being a unique subset of the original multicast request and including a routing tag which enables a non-blocking, self-routing distribution to a subset of the desired outlets of the original multicast request of said network of degree larger than 2.

6. A method for multicasting an inlet data cell, received as part of an original multicast request D, through a self-routing multistage network apparatus to a plurality of desired outlets, the method comprising the steps of decomposing the original multicast request D, defining a set of desired outlets, received by a single self-routing multistage network into one or more intermediate multicast requests, each intermediate multicast request being a unique subset of the original multicast request and including a routing tag which enables a non-blocking, self-routing distribution to a subset of the desired outlets of the original multicast request in one or two passes through the network, and generating a non-blocking multicast tree based on the intermediate multicast requests and routing the received inlet data cell to the desired outlets, wherein the decomposing step and generating step use a cube routing algorithm, the decomposing step further using the Quine-McCluskey method for decomposing the original multicast request received by the network into a plurality of cubes $C=(C_1 \ldots C_r)$, each cube $C_1 \ldots C_r$ being an intermediate multicast request identifying a unique subset of the original multicast request which identifies desired outlets to which the inlet data cell is routed in a single pass through the network.

7. The method of claim 6 wherein the plurality of cubes are partitioned using a Greedy partitioning algorithm to select the largest possible cubes $C=(C_1 \ldots C_r)$ in descending order of their size to obtain the set $P=(P_1 \ldots P_m)$, where each P is a cube with $|P_i| \leq |P_{i+1}|$, and where m is an integer.

8. The method of claim 7 wherein the greedy partitioning algorithm is characterized by the following steps:

(a) choosing and removing the largest cube from the plurality of cubes C (b) choosing and removing the next largest cube from the remaining plurality of cubes that does not contain any of the outlets previously identified, (c) repeating step (b) until all the desired outlets are identified, and wherein the cubes selected in steps (a) and (b) are the set P which is the partition of D where $P=\{P_1 P_2, \ldots, P_m\}$, where each P is a cube with $|P_i| \geq |P_{i+1}|$ and where m is an integer.

9. The method of claim 2 wherein said generating step includes the steps of (a) selecting and removing a largest cube from an outlet set P where $P=\{P_1, P_2, \ldots, P_m\}$, where each P is a cube with $|P_i| \geq |P_{i+1}|$ and where m is an integer, (b) using the outlets of the largest cube as inlets for a second stage of a build-up of a multicast tree, (c) for each inlet, selecting and removing a next largest cube from the set P that does not cause blocking with existing cubes in a current stage, (d) using the outlets of the identified cubes as the inlets of a next stage, and (e) repeating steps (c) and (d) until all the cubes in the set P have been identified.

10. The method of claim 9 wherein a non-blocking condition is determined by the following steps (a) computing the distance between two inlets $s_1$, $s_2$ of the network, the distance being a least significant bit position in which $s_1$ and $s_2$, in binary representation, disagree, (b) computing the distance between two cubes $C_1$, $C_2$ at the output of the network as a most significant bit position, excluding 'don't care x' positions, in which $C_1$ and $C_2$ in binary representation disagree, and (c) identifying multicast connections as non-blocking when two selected inlets of the network which are at a distance $d_{in}$ and which are connected to two disjoint cubes at a distance $d_{out}$ satisfy the equation $$d_{out} - d_{in} \geq 0.$$

11. The method of claim 1 wherein the decomposing step and generating step use a copy routing algorithm which performs the following steps recursively (A) generate $2^{a_i}$ copies at contiguous outlets, for any $a_i \neq 0$, where $|D|=a_{n-1}, a_{n-2}, \ldots, a_0$, where a and n are integer numbers and (B) each of these copies reach a desired outlet selected from D in either a decreasing or an increasing order.

12. A method for multicasting an inlet data cell, received as part of an original multicast request D, through a self-routing multistage network apparatus to a plurality of desired outlets, the method comprising the steps of decomposing the original multicast request D, defining a set of desired outlets, received by a single self-routing multistage network into one or more intermediate multicast requests, each intermediate multicast request being a unique subset of the original multicast request and including a routing tag which enables a non-blocking, self-routing distribution to a subset of the desired outlets of the original multicast request in one or two passes through the network, and generating a non-blocking multicast tree based on the intermediate multicast requests and routing the received inlet data cell to the desired outlets, wherein the decomposing step and generating step use a copy routing algorithm and wherein the decomposing step of the copy routing algorithm includes the steps of (a) generating $2^{a_i}$ copies of the inlet data cell at contiguous outlets, and (b) for each of the copies, addressing a desired outlet of D in either a decreasing or increasing order; and wherein the generating step includes the step of repeating steps (a) and (b), for any $a_i \neq 0$, where $o \leq i \leq n-1$, where a is an integer, where n=an integer number equal to the number of stages in the network, and where the multicast request is defined as $|D|=a_{n-1}, a_{n-2} \ldots a_0$, so as to generate a non-blocking multicast tree.

13. The method of claim 1 wherein the decomposing step and generating step use a combined routing algorithm which includes a copy routing algorithm for stage one of the network and a cube routing algorithm for other stages of the network, wherein the copy routing algorithm performs the following steps recursively (A) generate $2^{a_i}$ copies at contiguous outlets, for any $a_i \neq 0$, where $|D|=a_{n-1}, a_{n-2}, \ldots a_0$, where a and n are integer numbers and (B) each of these copies reach a desired outlet selected from D in either a decreasing or an increasing order, and and wherein the cube routing algorithm performs the partition P of the multicast request D to form a multicast tree, each node of the multicast tree corresponding to a cube in P, where $P=\{P_1, P_2, \ldots, P_m\}$, where each P is a cube with $|P_i| \geq |P_{i+1}|$, and m is an integer.

14. A method for multicasting an inlet data cell, received as part of an original multicast request D, through a self-routing multistage network apparatus to a plurality of desired outlets, the method comprising the steps of decomposing the original multicast request D, defining a set of desired outlets, received by a single self-routing multistage network into one or more intermediate multicast requests, each intermediate multicast request being a unique subset of the original multicast request and including a routing tag which enables a non-blocking, self-routing distribution to a subset of the desired outlets of the original multicast request in one or two passes through the network, and generating a non-blocking multicast tree based on the intermediate multicast requests and routing the received inlet data cell to the desired outlets, wherein the decomposing step and generating step use a combined routing algorithm and wherein the decomposing step includes the steps of (a) generating $2^j$ copies of the inlet data cell where $j = \max\{i | a_i \neq 0; 0 \leq i \leq n-1\}$, where a is an integer and n=an integer number equal to the number of stages in the network.

(b) decomposing the original multicast request into a plurality of cubes $C=(C_1 \ldots C_r)$, each cube $C_1 \ldots C_r$ being an intermediate multicast request identifying a subset of desired network outlets to which an inlet data cell can be routed in a single pass through the network, and (c) generating a non-blocking multicast tree based on the intermediate multicast requests and routing the received inlet data cell to the desired outlets.

15. The method of claim 14 wherein the decomposing step uses a Boolean logic minimization procedure to decompose the original multicast request D, defining a set of desired outlets, received by the network into a plurality of intermediate multicast requests, each intermediate multicast request being a unique subset of the original multicast request and including a routing tag which enables a non-blocking, self-routing distribution to a subset of the desired outlets of the original multicast request in one or two passes through the network.

16. The method of claim 1 wherein the decomposing step uses the Quine-McCluskey method to identify thereby a plurality of cubes $C=(C_1 \ldots C_r)$, each cube $C_1 \ldots C_r$ being an intermediate multicast request identifying a unique subset of desired outlets to cast request which identifies desired outlets to which the inlet data cell is routed in a single pass through the network.

17. The method of claim 6 wherein the plurality of cubes are partitioned using a Greedy partitioning algorithm to select the largest possible cubes $C=(C_1 \ldots C_r)$ in descending order of their size to obtain the set $P=(P_1 \ldots P_m)$, where each P is a cube with $|P_i| \geq |P_{i+1}|$, and where m is an integer.

18. The method of claim 17 wherein the greedy partitioning algorithm is characterized by the following steps:

(a) choosing and removing the largest cube from the plurality of cubes C, (b) choosing and removing the next largest cube from the remaining plurality of cubes that does not contain any of the outlets previously identified, (c) repeating step (b) until all the desired outlets are identified, and wherein the cubes selected in steps (a) and (b) are the set P which is the partition of D, where $P=(P_1 \ldots P_m)$, where each P is a cube with $|P_i| \geq |P_{i+1}|$, and where m is an integer.

19. The method of claim 14 wherein said generating step includes the steps of (a) using outlets of the generating step (a) of claim 13 as the inlets for a second stage of a build-up of a multicast tree, (b) for each inlet, selecting and removing the next largest cube from an output set P that does not cause blocking with existing cubes in the current stage, where $P=(P_1 \ldots P_m)$, where each P is a cube with $|P_i| \geq |P_{i+1}|$, and where m is an integer.

(c) using the outlets of the identified cubes as the inlets of a next stage, and (d) repeating steps (b) and (c) until all the cubes in the set P have been identified.

20. The method of claim 19 wherein a non-blocking condition is determined by the following steps:

(a) computing the distance between two inlets $s_1$, $s_2$ of the network, the distance being a least significant bit position in which $s_1$ and $s_2$ in binary representation disagree, (b) computing the distance between two cubes $C_1$, $C_2$ at the output of a network as the most significant bit position, excluding 'don't care x' positions, in which $C_1$ and $C_2$ in binary representation disagree, and (c) identifying multicast connections as non-blocking when two selected inlets of the network which are at a distance $d_{in}$ and which are connected to two disjoint cubes at a distance $d_{out}$ satisfy the equation $$d_{out} - d_{out} \geq 0.$$

21. A self-routing multistage network apparatus, having $n = \log N$ stages, where N is the number of inlets/outlets of the network, for multicasting an inlet data cell, received as part of an original multicast request D, to a plurality of desired outlets, the apparatus comprising means for decomposing the original multicast request D, defining a set of desired outlets, received by a single self-routing multistage network into a plurality of intermediate multicast requests, each intermediate multicast request including a routing tag which enables a non-blocking, self-routing distribution to a subset of the desired outlets of the original multicast request in one or two passes through the network, and means for generating a non-blocking multicast tree based on the intermediate multicast requests and for routing the received inlet data cell to the desired outlets by recirculation of at least one intermediate multicast request through the network.

22. A self-routing multistage network apparatus for multicasting an inlet data cell, received as part of an original multicast request D, to a plurality of desired outlets, the apparatus comprising means for decomposing the original multicast request D, defining a set of desired outlets, received by a single self-routing multistage network into one or more intermediate multicast requests, each intermediate multicast request being a unique subset of the original multicast request and including a routing tag which enables a non-blocking, self-routing distribution to a subset of the desired outlets of the original multicast request in one or two passes through the network, and means for generating a non-blocking multicast tree based on the intermediate multicast requests and for routing the received inlet data cell to the desired outlets wherein said decomposing means utilizes a cube routing algorithm to decompose the original multicast request into a plurality of cubes, each cube being an intermediate multicast request identifying a subset of the desired outlets to which an inlet data cell can be routed in a single pass through the apparatus and said generating means utilizes a cube routing algorithm to generate a non-blocking multicast tree based on the plurality of cubes.

23. The apparatus of claim 22 including two or more switching apparatuses to pipeline the routing of sequential data cells through the network apparatus to reduce transit time of each data cell.

24. A self-routing multistage network apparatus for multicasting an inlet data cell, received as part of an original multicast request D, to a plurality of desired outlets, the apparatus comprising means for decomposing the original multicast request D, defining a set of desired outlets, received by a single self-routing multistage network into one or more intermediate multicast requests, each intermediate multicast request being a unique subset of the original multicast request and including a routing tag which enables a non-blocking, self-routing distribution to a subset of the desired outlets of the original multicast request in one or two passes through the network, and means for generating a non-blocking multicast tree based on the intermediate multicast requests and for routing the received inlet data cell to the desired outlets wherein said decomposing means and said generating means utilize a copy routing algorithm and wherein said apparatus further comprises a first switching apparatus including said decomposing means and a second switching apparatus, connected to said first switching apparatus, which together with said first switching apparatus includes said generating means.

25. A self-routing multistage network apparatus for multicasting an inlet data cell, received as part of an original multicast request D, to a plurality of desired outlets, the apparatus comprising means for decomposing the original multicast request D, defining a set of desired outlets, received by a single self-routing multistage network into one or more intermediate multicast requests, each intermediate multicast request being a unique subset of the original multicast request and including a routing tag which enables a non-blocking, self-routing distribution to a subset of the desired outlets of the original multicast request in one or two passes through the network, and means for generating a non-blocking multicast tree based on the intermediate multicast requests and for routing the received inlet data cell to the desired outlets wherein said decomposing means and said generating means utilize a combined routing algorithm and wherein said apparatus further comprises a first switching apparatus including means for generating $2^j$ copies of the inlet data cell where $j = \max\{i | a_i \neq 0; 0 \leq o \leq n-1,$ where a is an integer, where n=an integer number equal to the number of stages in the network a second switching apparatus including decomposing means for decomposing the original multicast request into a plurality of cubes, each cube being an intermediate multicast request identifying a subset of desired outlets to which an inlet data cell can be routed in a single pass through the apparatus, and generating means for generating a non-blocking multicast tree based on the intermediate multicast requests and for routing the received inlet data cell to the desired outlets.

26. The method of claim 1 wherein the decomposing step uses the Quine-McCluskey method to identify the plurality of cubes $C=(C_1 \ldots C_r)$, each cube $C_1 \ldots C_r$ being an intermediate multicast request identifying a unique subset of the original multicast request which identifies desired outlets to which the inlet data cell is routed in a single pass through the network.

* * * * *